(12) United States Patent
Zellak et al.

(10) Patent No.: US 7,515,806 B2
(45) Date of Patent: Apr. 7, 2009

(54) FIBER OPTIC CABLE GUIDE

(75) Inventors: Darren Zellak, Lisle, IL (US); Chris Deas, Woodbridge (GB); Nicholas Burgess, Bexley (GB)

(73) Assignee: Richco Inc., Morton Grove, IL (US)

( * ) Notice: Subject to any disclaimer, the term of this patent is extended or adjusted under 35 U.S.C. 154(b) by 121 days.

(21) Appl. No.: 11/660,478

(22) PCT Filed: Aug. 24, 2005

(86) PCT No.: PCT/US2005/030119

§ 371 (c)(1),
(2), (4) Date: Nov. 5, 2007

(87) PCT Pub. No.: WO2006/026302

PCT Pub. Date: Mar. 9, 2006

(65) Prior Publication Data

US 2008/0131070 A1 Jun. 5, 2008

(51) Int. Cl.
*G02B 6/00* (2006.01)
*F16L 3/00* (2006.01)

(52) U.S. Cl. .............. 385/137; 385/134; 385/136; 248/49; 174/68.3; 174/68.1; 174/21 R

(58) Field of Classification Search ......... 385/134–137; 174/68.3, 68.1, 21 R; 248/49
See application file for complete search history.

(56) References Cited

U.S. PATENT DOCUMENTS 6,463,728 B1 * 10/2002 Daoud ................ 59/78.1
6,567,602 B2 * 5/2003 Cole et al. ............ 385/136

* cited by examiner

*Primary Examiner*—Frank G Font
*Assistant Examiner*—Michael P. Mooney
(74) *Attorney, Agent, or Firm*—Martin Faier; James M. Faier; Faier & Faier P.C.

(57) ABSTRACT

This invention provides a cable guide (10) capable for securely routing a plurality of cables (C), such as fiber optic cables (C). The cable guide has at least two fastening units (12), an optional guide unit (14), and a flexible connector (16) for providing a spaced apart connection for the units, and the space (17) may be utilized for exiting one or more cables (C) from a bundle of cables restrained by the cable guide (10). The invention also includes supports or standoffs and joinder clips for securing and routing cable guides on a chassis, printed circuit board or other surface, as desired.

28 Claims, 5 Drawing Sheets

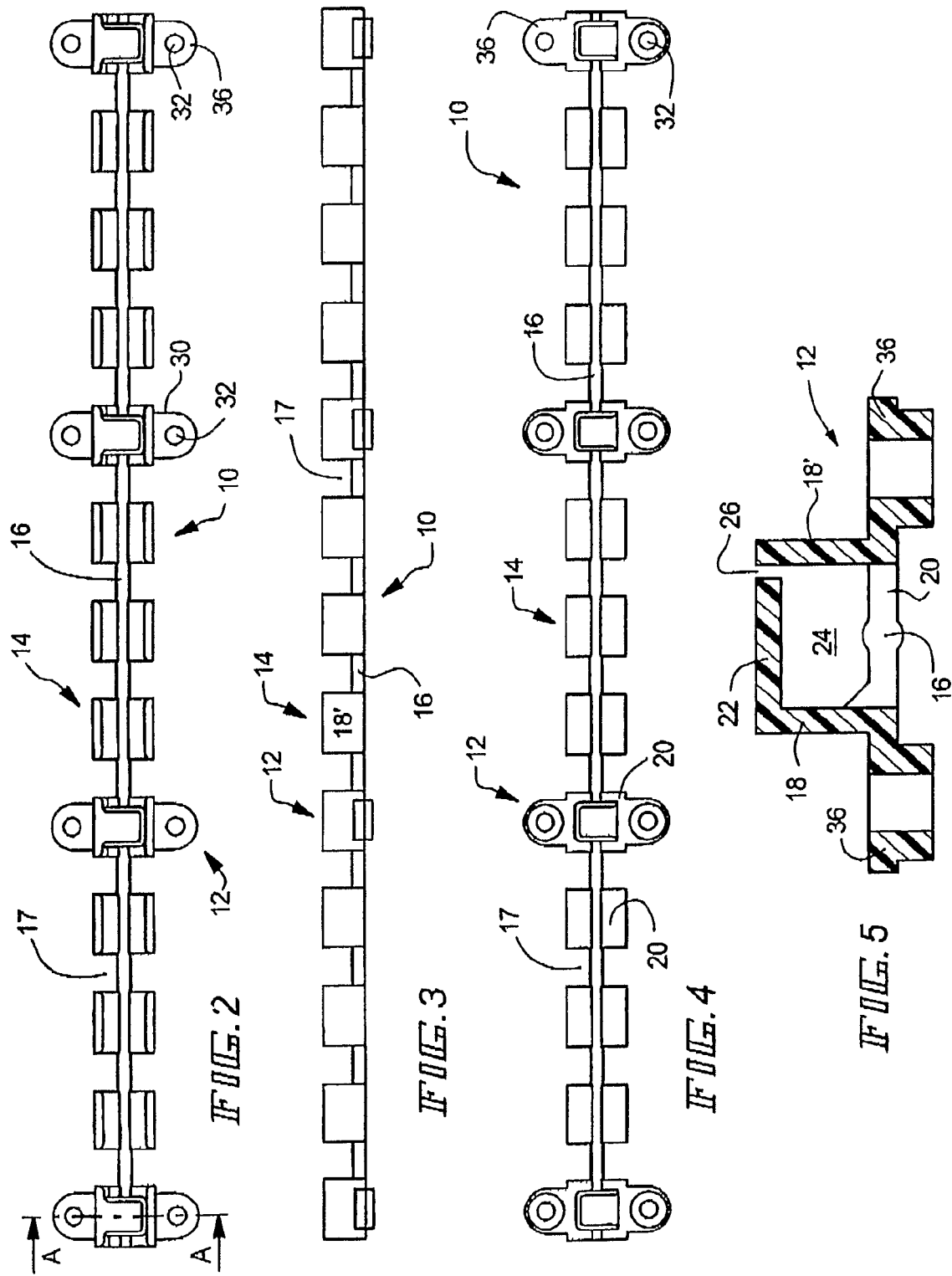

FIBER OPTIC CABLE GUIDE

This invention relates to a flexible guide for directing and managing fiber optic cables.

BACKGROUND OF THE INVENTION

As electronic components have become smaller and more densely packed, more electrical, optical or other forms of signal transmission cables are attached to the components. Accordingly the components have become more difficult to organize, and individual cables are less easily separable and identifiable from the other cables. In addition, as the cables become more densely packed, they are subject to more stress and great probability of entanglement and damage. This situation is particularly significant for optical fiber. Optical fibers have a minimum bend radius. If the optical fibers are bent beyond the minimum bend radius, the fibers will be damaged. When used in this application, "cable" refers to optical fiber.

SUMMARY OF THE INVENTION

The present invention provides cable guides capable for securely routing and managing a plurality of cables to electrical components and for mounting the same. These cable guides comprises at least two fastening units, an optional guide unit and a flexible connector to provide a spaced apart connection for the units. The cable guides embodying the invention may also include novel means for mounting the cable guides on a surface, such as a chassis or the like, and for joining cable guides as desired. Preferably, the cable guides embodying the invention are fabricated from plastic dielectric insulating material, which when molded is relatively flexible and strong.

OBJECTS AND ADVANTAGES OF THE INVENTION

It is the object of the invention to provide cable guides for fiber optic cable of the character referred to.

Another object is to provide cable guides having spaced apart fastening units which may be used to allow optical fiber or the like to enter and exit at various points along the length of the guide.

Another object is to provide cable guides having spaced apart optical cable guide units.

Another object is to provide cable guides which can be mounted directly to a printed circuit board or held above a board for routing over and around raised components and which may be cut to desired lengths.

Another object is to provide cable guides having a flexible connector for spaced apart connection means for fastening and guide units and which may be oriented in substantially all desired planes.

Another object is to provide a cable guide and connectors and standoffs and supports usable therewith which have suitable structure for mounting and routing the cable guide as desired.

Another object is to provide a cable guide which is inexpensive to manufacture, and very easy to use and efficient to protect and train cables for connection to selected components.

These and other objects and advantages will become more apparent as this description proceeds, taken in conjunction with the accompanying drawings.

BRIEF DESCRIPTION OF THE DRAWINGS

In the drawings:

FIG. 2 is a top plan view of the embodiment in FIG. 1.

FIG. 3 is a side elevational view of the embodiment of FIG. 1.

FIG. 4 is a bottom plan view of the embodiment of FIG. 1.

FIG. 5 is a cross-sectional view of the embodiment in FIG. 2, taken along line A-A.

FIG. 11 is an elevational view of a joinder clip for joining and supporting two cable guide units like the embodiment shown in FIG. 6.

DETAILED DESCRIPTION OF A PREFERRED EMBODIMENT

Figure 1:
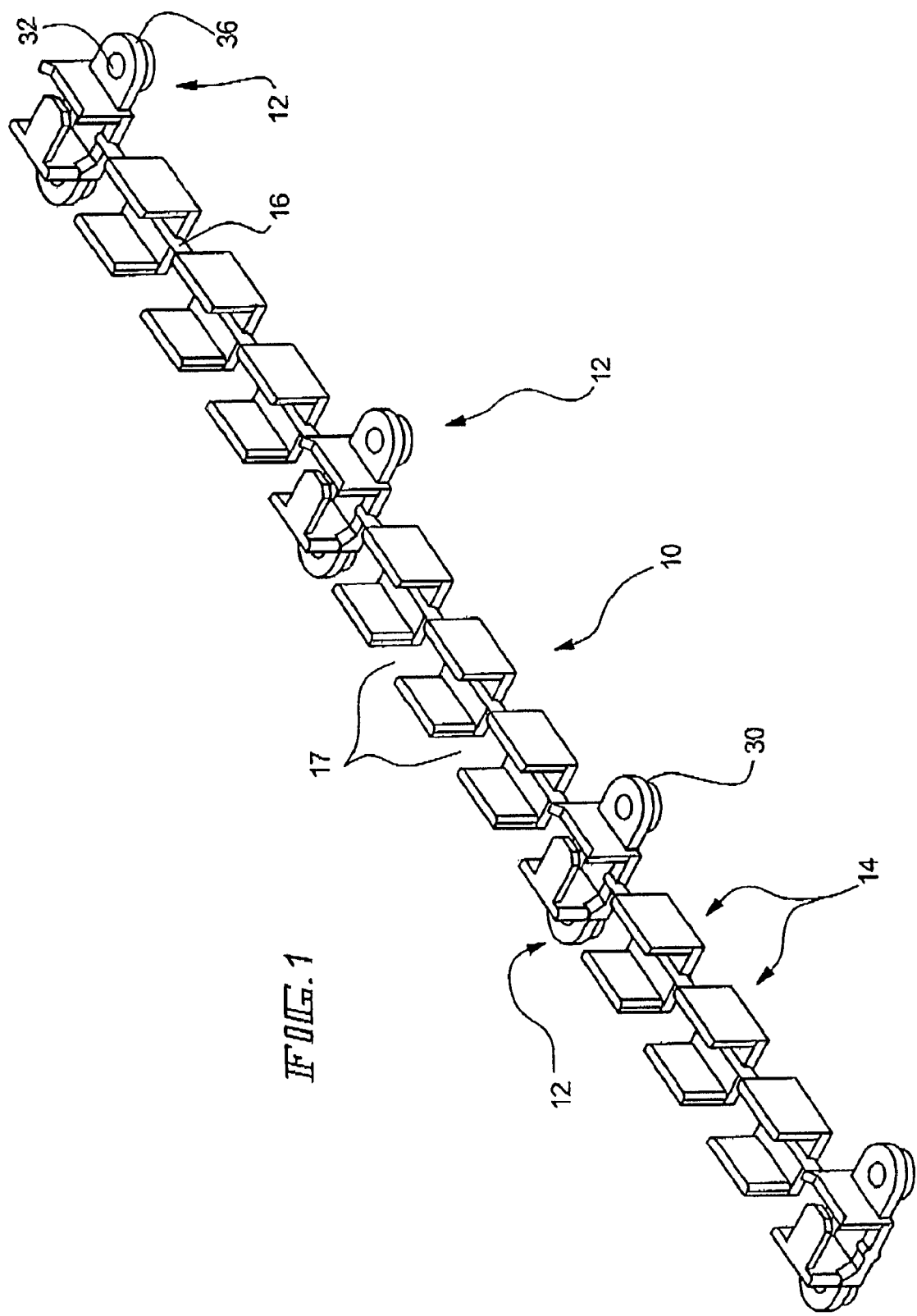
FIG. 1 is a perspective view of an embodiment of a cable guide embodying the invention.
Figure 7:
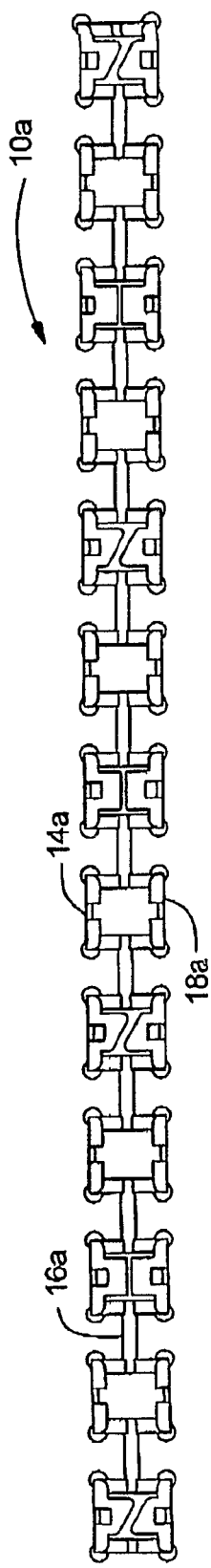
FIG. 7 is a top plan view of the embodiment of FIG. 6.
Figure 6:
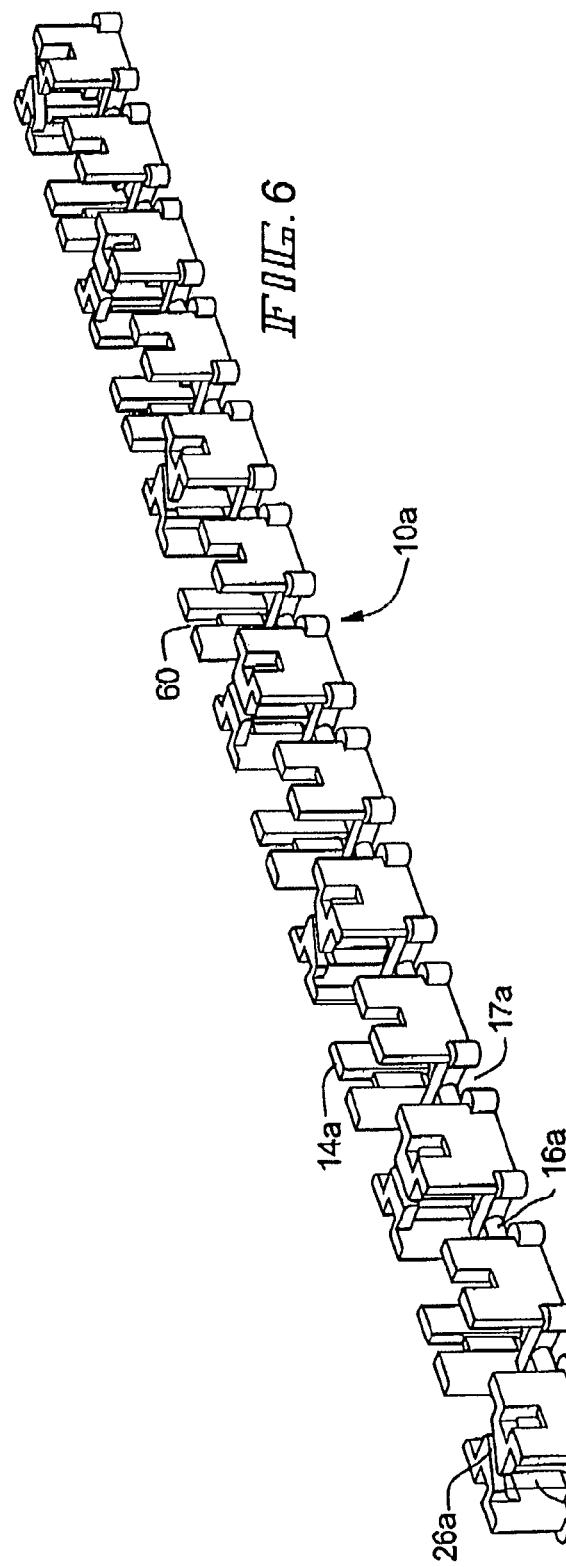
FIG. 6 is a perspective view of a second embodiment of a cable guide embodying the invention.
Figure 8:
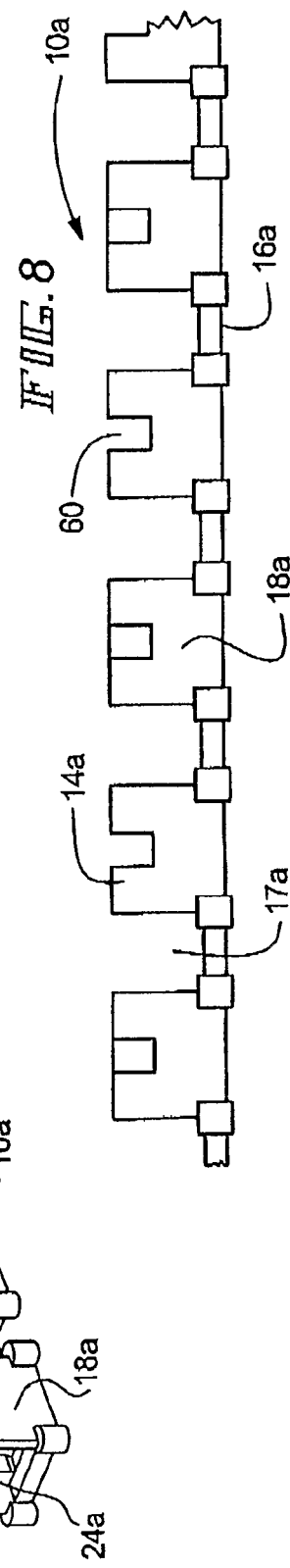
FIG. 8 is a side elevational view of part of the embodiment of FIG. 6.
Figure 9:
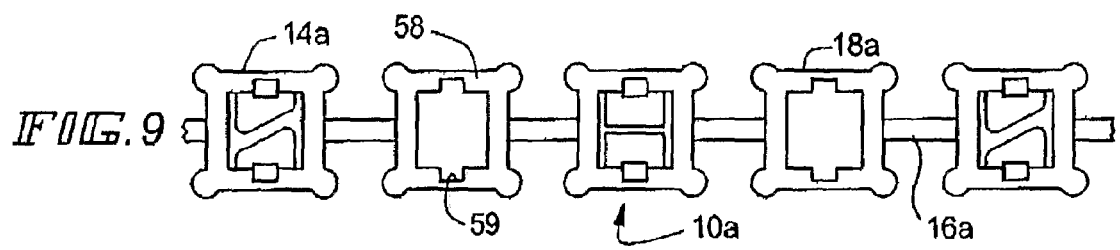
FIG. 9 is a bottom plan view of part of the embodiment of FIG. 6, similar to FIG. 8.
Figure 10:
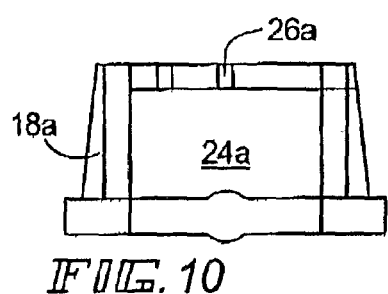
FIG. 10 is an end elevational view of the embodiment of FIG. 6.

The invention is described by the following examples. It should be recognized that variations based on the inventive features disclosed herein are within the skill of the ordinary artisan, and the scope of the invention should not be limited by the examples. To properly determine the scope of the invention, an interested party should consider the claims herein, and any equivalents thereof. In addition, all citations herein are incorporated by reference. In the context of the present disclosure, similar components illustrated in different figures are cited by the same reference number.

A first embodiment of the cable guide 10 according to the invention is shown in FIGS. 1-5. The embodiment comprises four fastening units 12 and nine guide units 14 held in a spaced apart assembly by a connector 16 with spaces 17 separating the units. In the embodiment shown, fastening unit 12 comprises side walls 18 and 18', base 20, and top wall 22 that forms a channel 24 (see FIG. 5). Top wall 22 is attached to side wall 18 and forms restricted access 26 in conjunction with side wall 18'. Restricted access 26 provides sufficient space for a cable to be forced into channel 24, thereby securing the cable to the cable guide 10. Once in channel 24, the cable cannot bypass restricted access 26 without application of a sufficient opposing force to overcome the resilient forces provided by top wall 22 and side wall 18'. Each unit is attached to one or more other units by connector 16. In an alternative embodiment, top wall 22 is capable of being releasably attached to side wall 18', and restricted access 26 is formed with the top wall 22 is released from side wall 18'.

As shown, guide unit 14 comprises two side walls 18', and a base 20 and connected in a spaced-apart assembly to the other units by connector 16. Cables are freely inserted and removed from guide units 14. Although each of the guide units 14 and the fastening unit 12 are shown as having a substantially rectangular cross section, alternative embodiments can comprise numerous cross-sections. In an alternative embodiment, each unit has a substantially circular cross-section formed from a single semi-circular wall, whereby the ends of the semi-circle form a restricted access with sufficient space for a cable to be forced into the channel formed by the wall.

By connecting the units in a spaced-apart assembly, the cable guide 10 is capable of being oriented in a number of different planes. Such cable guides can be mounted directly to a printed circuit board ("PCB") or held above a board for routing over and around raised components. These cable guides may also be cut to length as desired or joined with similar units to extend their length.

With reference to the embodiment shown in FIGS. 6-10, the guide units 14a have side walls 18a with channels 24a formed midway their width to permit cables C to exit from or enter into a guide unit at substantially any point along the cable guide 10a.

It is also sometimes desirable to elevate the cable guides 10a above the support surface, such as on a printed circuit board, on which the cable guide is mounted. Sometimes, electrical components are mounted on such a circuit board, so additional elevation of the cable guide is required. Often, multiple cable guides 10a are required to accomplish the entire cable run, and accommodations for joining multiple cable guides is desired. FIGS. 11A, 11B and 11C illustrated various support posts or standoffs for flexible cable guides embodying the invention. Each of these support post have fasteners 40 which may be secured in an apertured printed circuit board PCB, and shafts 41, 42 and 43, respectively, extend from such connectors 40 In FIG. 11C, the upper end of the shaft has a web 44, which permits it to impart flexibility to the upper end of the support post. An integral support table 45 is on the upper end of each of the support post shafts 41, 42 or 43. Extending upwardly from each support table 45 are a plurality of flexible barbed teeth 46.

Figure 11:
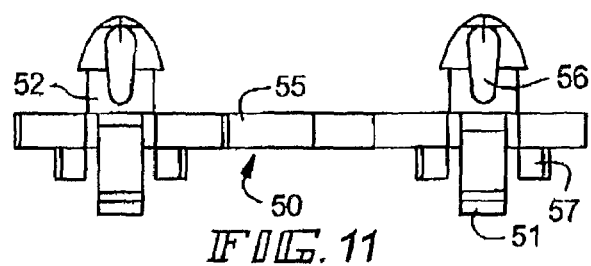
FIGS. 11(A), 11(B), and 11©) are perspective views of supports posts, standoffs and the like which can be used for mounting the cable guides embodying the invention.
Figure 11A:
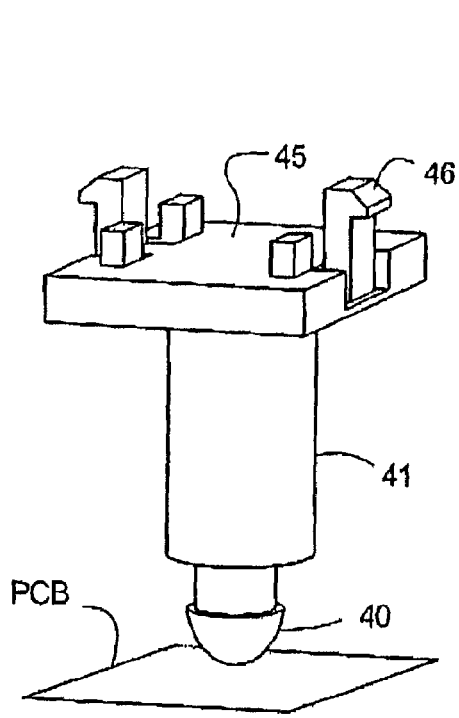
Figure 11B:
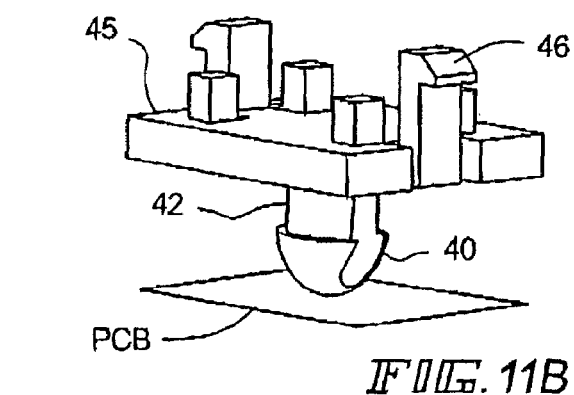
Figure 11C:
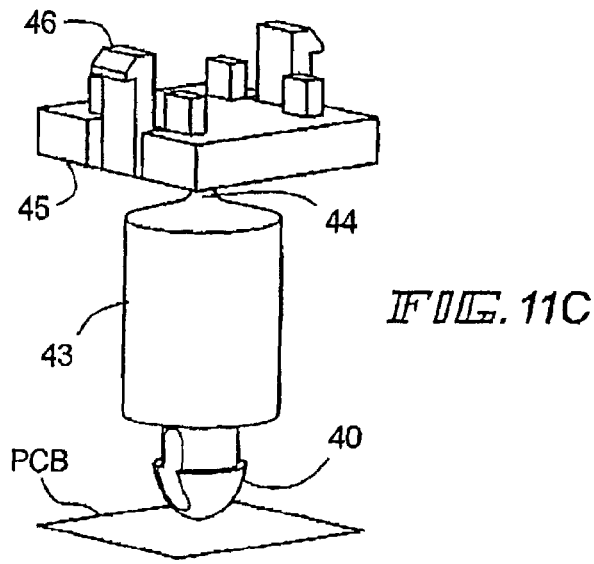

In FIG. 11, a joinder clip 50 is shown for connecting two cable guides 10a together, and this clip also has a fastener 51 for connecting it to an underlying printed circuit board or chassis, and the clip has a table 55 about midway its height. A shaft 52 extend upwardly from the table 55 and has a tooth 56 spaced above the table. This clip 50 also has extra reinforcement 57 intended to bear upon the upper surface of a printed circuit board or chassis on which it is mounted.

The embodiment of the invention shown in FIGS. 6-10 is fabricated to accommodate the support posts shown in FIGS. 11A, 11B and 11C. The underside 58 of the cable guide 10a shown in FIG. 9 has a series of slots 59, preferably one on each opposed side of the guide unit angularly disposed to the connectors 16a between guide units 14a, which are adapted to receive the flexible barbed teeth 46 of a selected support post. In this embodiment, the side 18a of each guide unit 14a has a notch 60 giving the guide additional versatility for exit or entry of cable C from the unit 14a as well as from the space 17a between the connectors 16a. Restricted access 26a is also provided for removably securing faber cable C in the guide 10a.

Figure 12:
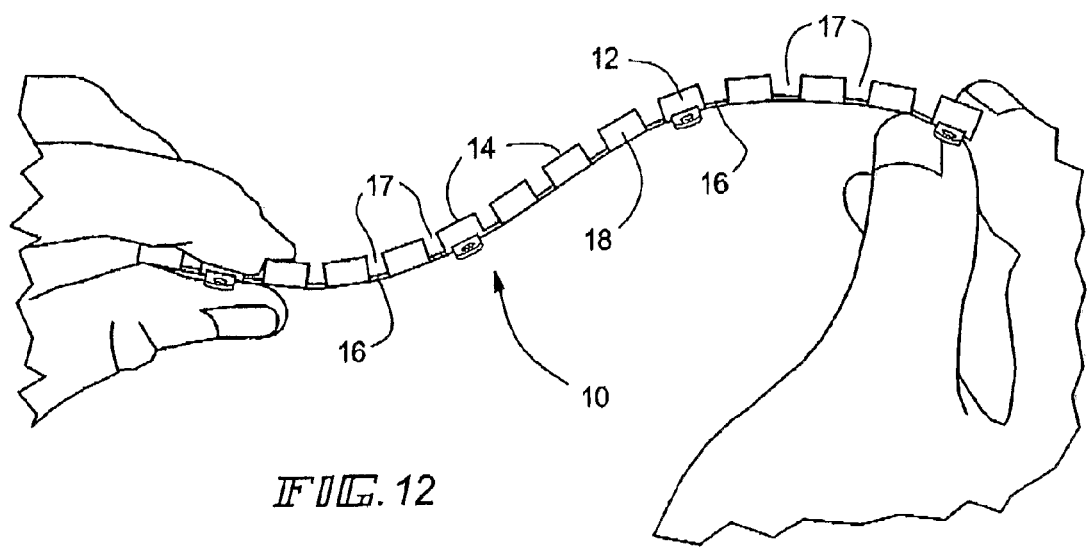
FIG. 12 is an illustration demonstrating the flexibility of a cable guide according to the invention, held by a user.
Figure 13:
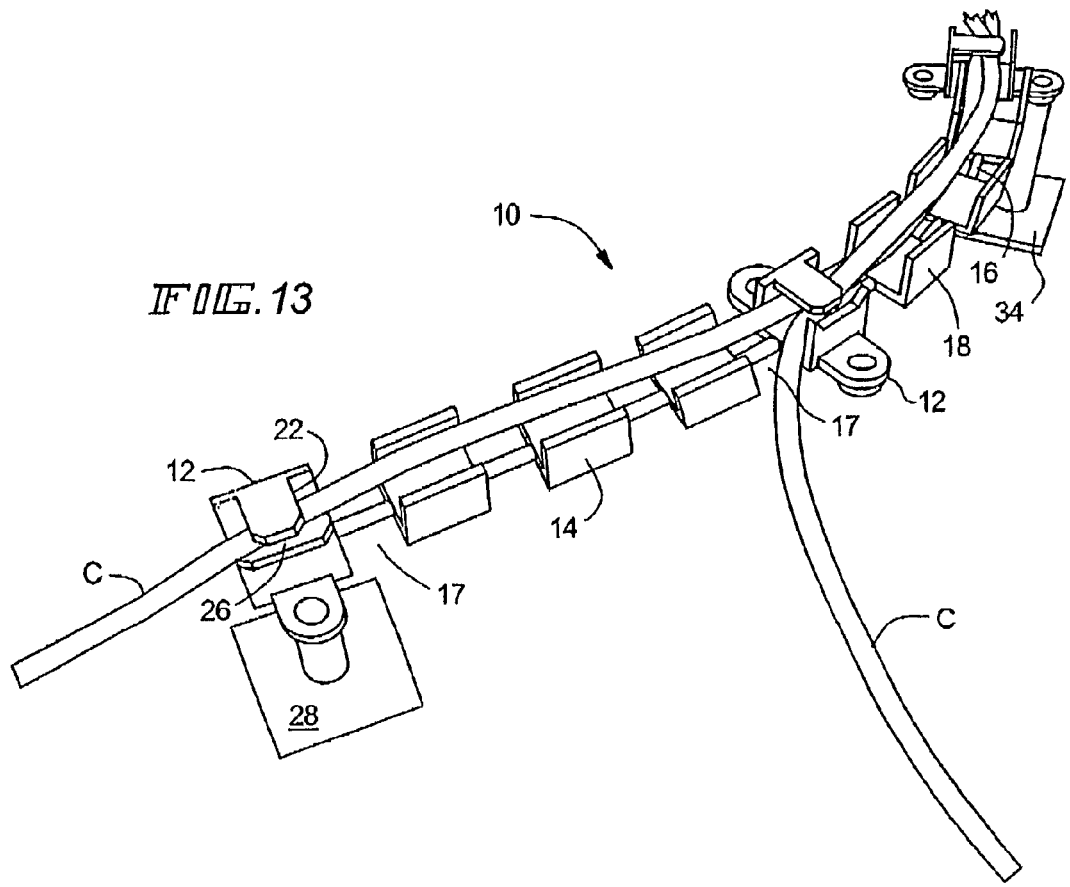
FIG. 13 is an illustration showing two optical cables secured and routed by a cable guide according to the invention.

FIG. 12 illustrates the flexibility of the cable guide 10 (or 10a) according to the invention along a vertical plane, such that one end of the cable guide is at a different elevation than the other end. FIG. 13 shows the flexibility of the cable guide 10 (or 10a) along a horizontal plane while routing a plurality of optical fiber cables C. In FIG. 13, one of the optical fiber cables C is routed through space 17 away from another cable. Once the cable exits the cable guide 10 (or 10a), it can be routed in any direction. Shown as routed to the left along the horizontal plane, the cable is capable of being routed at various heights, in accordance with the needs of the user. Although the guide shown secures two optical fibers, the ordinary artisan understands that these cable guides 10 can route many more cables, as contemplated within this invention.

The spaced apart assembly of the units also provides visibility of the cables being routed, so that individual cables can be separated and identified. Use of the guide units 14 or 14a provides even greater visibility of the cables being routed by the cable guide 10 or 14a. The flexible cable guide 10 or 10a allows cables to be protected, secured and routed on printed circuit boards and in optical racks. In an embodiment, a plurality of cables are secured to a printed circuit board (PCB) by a cable guide according to the invention. As shown in FIG. 13, the cable guides 10 are attached by standard mounts 28. In the embodiment shown, the fastening units further have optional flanges 36, having an aperture 32 for receiving a screw or rivet or other fastener (not shown). The cable guides or 10a are also capable of being attached by rivets, adhesives and spacers.

Herein, the guides are shown as a 13 unit device, with four fastening units 12, each fastening unit separated from the other fastening unit by three guide units 14. However, different lengths and different combinations of fastening units 12 and guide units 14 are possible. In an alternative embodiment, two fastening units 12 may be connected in a spaced apart assembly. In another embodiment, the cable guide 10 may be of sufficient length to complete a 360 degree loop to form a spool for cable storage.

The cable guides 10 according to the invention are made from a variety of materials. In one embodiment, the cable guide is made of polymers. In another embodiment, the cable guide 10 is made of nylon. In a further embodiment, the cable guide 10 is made from molded silicon rubber. In another embodiment the fastening units 12 and guide units 14 and the connectors 16 are molded into a unitary assembly. In an additional alternative embodiment, these units are formed separately. The units are then assembled by attaching the units to the connectors 16. Additionally, a further embodiment provides that the units are formed with a portion of the connector. When the units are assembled, each unit is capable of being attached to a connector.

While preferred and alternative embodiments have been shown and discussed in detail, many changes may be made in the structure without departing from the spirit or scope of the invention. Accordingly, the invention should not be limited to the exact construction described and shown.

We claim:

1. A cable guide for managing and routing cables comprising:

multiple units consisting of fastening units, each capable of releasably securing a plurality of cables, and multiple guide units, wherein said guide units are interspersed between said fastening units; and a connector that connects all of the units so that each unit is separated from another unit by a space;

wherein, each fastening unit comprises a base, side walls, a top wall that is attached to one side wall, and top wall having a restricted access for a cable, and means for attaching said cable guide to an underlying surface; and wherein each guide unit comprises a base and opposed side walls adapted to hold said cable and to allow one or more cables to extend away from one of said guide units free of another guide unit.

2. The cable guide recited in claim 1, wherein said connector is flexible and bendable in several planes relative to said guide and fastening units.

3. The cable guide recited in claim 1, wherein said attachment means comprises a flange formed on the base of one of said fastening means.

4. The cable guide recited in claim 3, wherein said flange has an aperture for receiving a fastener to secure said cable guide to said underlying surface.

5. The cable guide recited in claim 1, wherein said attachment means comprises a standoff adapted for connection to said underlying surface.

6. The cable guide recited in claim 5, wherein said standoff and one of said unit have cooperating clip means for removably securing said unit to said standoff.

7. The cable guide recited in claim 6, wherein said standoff has a shaft for elevating said units spaced apart from said underlying surface.

8. The cable guide recited in claim 5, wherein said base of said unit has slots for receiving said standoff.

9. A cable guide for managing and routing one or more flexible cables over an underlying surface, said guide comprising first and second fastening units, each capable for releasably securing a plurality of cables and allowing a cable to be released from said unit without affecting another cable secured in said unit, wherein said first and second fastening units are attached by a connector with a space between said units, said connector being flexible and selectively adapted to move in multiple planes, and means for mounting said units on said underlying surface.

10. The cable guide according to claim 9 further comprising a guide unit attached between the fastening units.

11. The cable guide according to claim 9 further comprising a third fastening unit and two guide units attached between each fastening unit, wherein each fastening unit comprises a flange with an aperture.

12. The cable guide according to claim 10, wherein each fastening unit comprises a base, two side walls, a top wall that is attached to one side wall, and forms a restricted access with the other side wall; and a flange having an aperture attached to each side wall, and each guide unit comprises a base and two side walls.

13. The cable guide according to claim 10, wherein one of each pair of guide units between the fastening units comprises an aperture capable of securing a post of a mount.

14. The cable guide according to claim 9 molded as a unitary assembly from a polymer.

15. The cable guide according to claim 14, wherein the polymer is nylon.

16. The cable guide according to claim 14, wherein the polymer is silicone rubber.

17. The cable guide recited in claim 9, wherein a standoff connects said fastening unit to said underlying surface.

18. The cable guide recited in claim 17, wherein said standoff and one of said units have cooperating means for releasably securing said units to said standoff.

19. The cable guide recited in claim 18, wherein said cooperating means has a barbed tooth and a slot for receiving said barbed tooth.

20. The cable guide recited in claim 9, wherein a connecting member is adapted for connecting the end of said cable guide to the end of another cable guide.

21. The cable guide recited in claim 20, wherein said connecting member has a support for elevating said cable guides over said underlying surface.

22. A method for mounting and routing a cable over an underlying surface of an electronic system, said method comprising:
arranging a length of flexible connected units consisting of guide units and fastening units in a selected path over said surface;
placing said cable in said units;
securing at least a part of said cable in a limited access way in one of said units;
securing said fastening units to said underlying surface according to said selected path.

23. In the method recited in claim 22 wherein the cables are optical fibers and multiple cables are arranged in said path and placed in said units.

24. In the method recited in claim 23, with the additional step of removing one of said cables from said units midway its length.

25. The method recited in claim 22, wherein said units comprise a cage having a base and side walls and said length of cable is captured in said cage.

26. The method recited in claim 25, with the additional step of mounting a standoff on said surface and connecting said standoff to said units.

27. The method recited in claim 26, wherein more than one standoff is provided for each of said lengths of cable and with the additional step of varying the elevation of said units over said surface by providing standoffs of different lengths.

28. The method recited in claim 22, wherein multiple cable guides are provided, and with the additional step of joining a cable guide to another cable guide by means of a joinder clip.

* * * * *